(Model.)
G. H. REYNOLDS.
Pressure Regulator for Air Compressing Engines.
No. 239,194. Patented March 22, 1881.
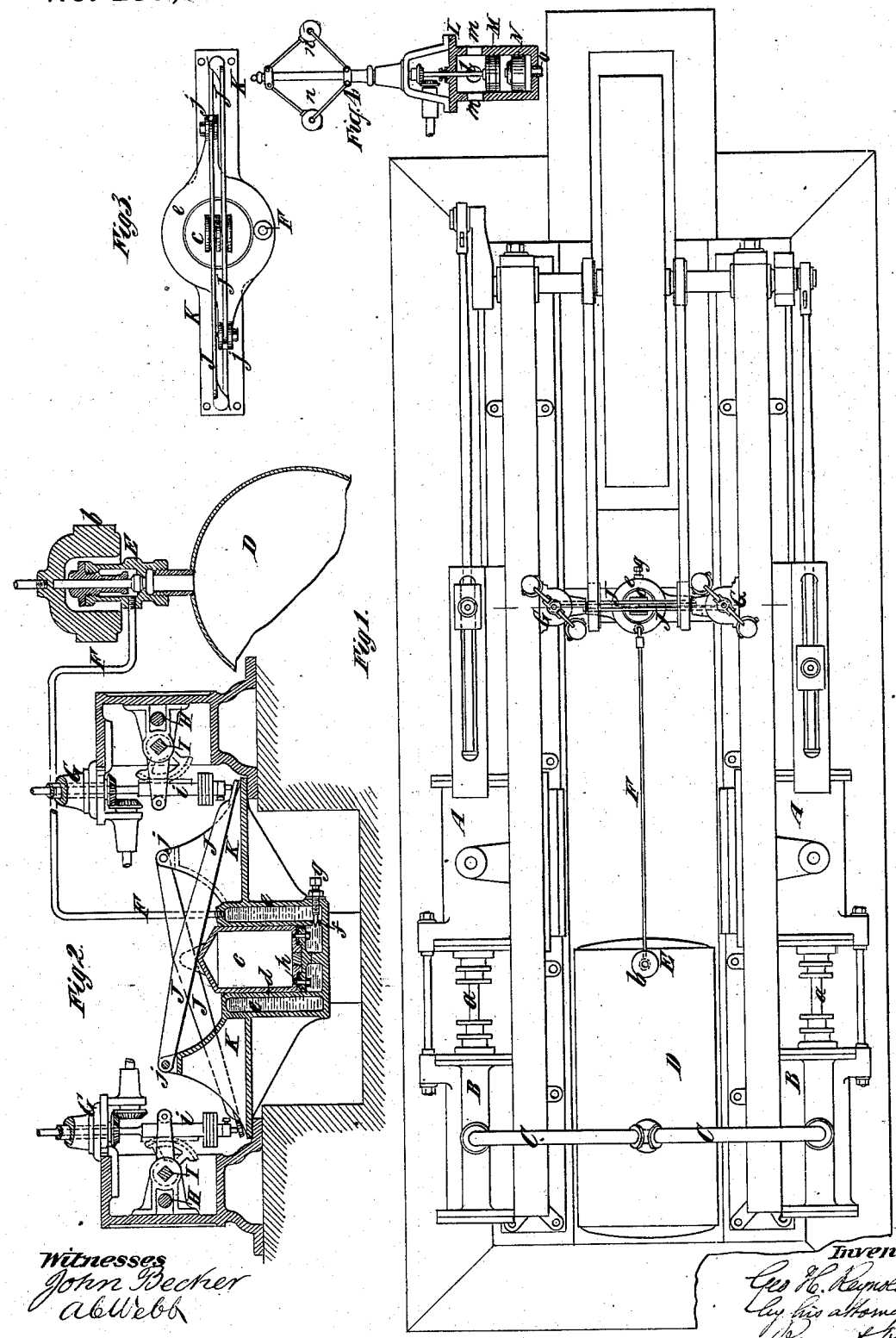

UNITED STATES PATENT OFFICE.

GEORGE H. REYNOLDS, OF NEW YORK, N. Y., ASSIGNOR TO HIMSELF AND GEORGE H. ROBINSON, OF SAME PLACE.

PRESSURE-REGULATOR FOR AIR-COMPRESSING ENGINES.

SPECIFICATION forming part of Letters Patent No. 239,194, dated March 22, 1881.

Application filed May 31, 1880. (Model.)

*To all whom it may concern:*

Be it known that I, GEORGE H. REYNOLDS, of the city of New York, in the county and State of New York, have invented certain new and useful Improvements in Pressure-Regulators for Air-Compressing Engines, of which the following is a specification.

The object of my invention is to provide, in a simple and effective manner, for controlling the supply of steam to an engine employed in compressing air, and to combine with such an engine a governor which controls the speed of the engine, and a pressure governor or regulator which remains inoperative so long as the air-pressure is below the maximum pressure desired, but which, when the air-pressure exceeds the desired pressure, will be actuated independently of the speed-governor to cut off the admission of steam and stop the engine, the whole being so organized that the speed-governor can act to control the speed of the engine without being in any way hindered or interfered with by the pressure-governor.

To this end the invention consists in the combination, with an air-compressing engine, of a governor for controlling the speed thereof, and a pressure regulator or governor which, when the pressure of air exceeds the maximum pressure desired, is actuated by the compressed air to shut off the supply of steam to the engine, the speed-governor and the pressure regulator or governor being so organized that the former can operate independently of and without affecting the latter. I preferably weight the pressure regulator or governor, so as to prevent it from acting until the maximum air-pressure desired is reached, when the steam will be shut off and the engine stopped at once.

The invention also consists in the combination, with an air-compressing engine and an air reservoir or receiver, of a governor for controlling the speed of the engine, and a pressure regulator or governor which, when the pressure of air exceeds the maximum pressure desired, is actuated by the compressed air to shut off the supply of steam to the engine, the speed-governor and the pressure regulator or governor being so organized that the former can operate independently of and without affecting the latter.

Instead of weighting the motor itself, the air reservoir or receiver may be furnished with an escape or relief valve which will open and permit air to pass to the regulator or governor when the maximum pressure desired is reached.

The operation of the regulator-motor may be utilized in various ways for controlling the supply of steam to the engine. The engine may, for example, be provided with a cut-off-valve gear, and the regulator-motor may be so connected with the cut-off as to adjust the same independently of the governor or any other devices.

My invention further consists in various novel features of construction and combinations of parts whereby the desired result is attained.

In the accompanying drawings, Figure 1 represents a plan of a pair of air-compressing engines having my pressure-regulating devices applied thereto. Fig. 2 represents a transverse section through such pair of engines upon a larger scale, and comprising a vertical section of my regulating devices and a sectional view of a portion of the air reservoir or receiver and its relief or escape valve. Fig. 3 represents a plan view of the regulator-motor and connections detached, and upon the same scale as Fig. 2; and Fig. 4 represents a detail view of a modified form of regulator.

Similar letters of reference designate corresponding parts in all the figures.

It will be understood that all the details of the engines and compressing apparatus are not illustrated, such parts only being shown as are necessary to describe the operation of my invention.

A designates the steam-cylinders, and B the air-compressing cylinders, arranged in this instance in line with each other, and the pistons of which are operated by the same piston-rods *a*.

C designates the discharge-pipes connected to the air-cylinders, and communicating with a reservoir or receiver, D, for the compressed air, here shown as arranged between the two cylinders.

The reservoir or receiver D may be provided with a relief or escape valve, E, the construction of which is clearly illustrated in Fig. 2, and which is furnished with a weight, *b*, by which it is held closed until the pressure in the reservoir or receiver exceeds the maximum pressure desired.

A valve of any other suitable construction might be substituted for the valve E, or the said valve dispensed with altogether and the pressure regulator or governor weighted, so that it will not act until the pressure of the air exceeds the maximum pressure desired.

F designates a pipe leading from the relief-chamber of the valve E, and serving to convey the compressed air escaping from the said chamber to a pressure regulator or governor, constituting a regulator-motor, connected with the steam-supply. The regulator-motor (clearly shown in Fig. 2) consists of a piston or plunger, $c$, fitted in a cylinder, $d$, so as to move longitudinally therein. As here represented, the cylinder is provided with a jacket forming a chamber, which constitutes a reservoir for any liquid—such as glycerine—not readily affected by evaporation or cold, and the air-pipe communicates with the said reservoir and transmits its pressure through the liquid therein.

In order to provide for regulating the flow of liquid from the reservoir into the cylinder $d$, I have shown an aperture, $f$, in said cylinder, and a screw, $g$, adapted to be adjusted to more or less close the said aperture $f$ and prevent the liquid from acting too quickly upon the piston or plunger $c$. To prevent the escape of liquid and to insure the positive working of the regulator, the piston or plunger is provided with a packing, $h$, of any suitable character.

The movement of the piston or plunger $c$ may be utilized in various ways to control the admission of steam to the steam-cylinders A. It might, for example, be connected to the throttle-valve, or to a separate valve in the steam-pipe. In this example of my invention the engines are furnished with cut-off-valve gear, and in any case the speed-governor and the pressure governor or regulator are so organized that the former can operate independently of and without affecting the latter.

H designates the main-valve rod, and I designates the cut-off-valve rod, which are so connected with the governor-spindles $i$ that the vertical movement of the latter imparts an oscillating movement or a partial rotation to the cut-off-valve rods and adjusts the point at which the admission of steam to the steam-cylinders A is cut off. In this example of my invention the piston or plunger $c$ of the regulator-motor acts upon crossed levers J, pivoted at one end, $j$, to the frame-work K, supporting the regulator-motor and arranged transversely to the engines, with their free ends projecting under the lower ends of the governor-spindles $i$.

When the air-pressure in the reservoir or receiver D exceeds the maximum pressure desired, at which the relief or escape valve E is set, the said valve is raised and the compressed air conveyed through the pipe F acts upon the liquid contained in the reservoir $e$ of the regulator-motor, and, forcing the liquid through the aperture $f$, raises the piston or plunger $c$, and by the action of the crossed levers J raises the governor-spindles $i$ and adjusts the cut-off valves to cut off the admission of steam earlier in the stroke of the engines. If the pressure in the reservoir or receiver D is increased sufficiently, the cut-off will be so adjusted as to stop the admission of steam to the engine at once; but upon the reduction of the air-pressure below the maximum pressure the regulator-motor ceases its operation, the liquid flows back from the cylinder $d$ into the reservoir $e$, and the cut-off valves are controlled, in the ordinary manner, by the governors.

In Fig. 4 I have represented a combined speed-governor and air-pressure regulator or governor of very simple construction.

L designates the body or valve-shell, which is constructed with an inlet-opening, $l$, for steam, and one or more outlet-openings, $m$, therefor.

M designates a piston-valve, actuated, in the usual manner, by means of the governor-balls $n$, so as to partially close the steam-outlets $m$, and thus regulate the speed of the engine.

In the shell or body L, below the piston-valve M, is a second piston, N, adapted to move up or down independently of the piston M. Air is admitted below the last said piston through a pipe, $o$, communicating with the reservoir or receiver for the compressed air, and the piston N is of such a weight that air under the maximum pressure will not raise it. When, however, the air-pressure exceeds the maximum pressure desired, the piston N will be raised, and, impinging against the piston-valve M, raises the latter and entirely cuts off the passage of steam to the engine or engines. As the pressure of air decreases, the piston N falls and the speed-governor resumes its operation.

By my invention I provide a very simple and effective means whereby the admission of steam to the compressing-engine may be regulated by the pressure of the compressed air, and thus prevent the loss of power which is entailed when surplus air is blown off from a safety-valve and wasted, and I also provide for stopping the engine when the use of air from the reservoir or receiver ceases.

I am aware that both air-compressing engines and pumping-engines have been provided with speed-governors, and also with pressure-governors, either of which will operate to shorten the point of cut-off of the valves of the engine when the contingency for which it is intended arises. In such cases, however, the speed-governor is hampered by the pressure-governor, and cannot act independently of and without being influenced by the pressure-governor, and as the speed-governor of air-compressing engines is almost constantly varying the point of cut-off in proportion as the amount of compressed air taken from the reservoir or receiver increases or diminishes, it is of the utmost importance that said speed-governor should not be affected or hindered in its operation in any way by the pressure-governor.

The essential advantage of my apparatus consists in the fact that the speed-governor can act entirely independently of and without being hindered by the pressure-governor, to control the engine to prevent all variations of speed of the engine resulting from more or less air being taken from the compressed-air reservoir or receiver.

What I claim as my invention, and desire to secure by Letters Patent, is—

1. The combination, with an air-compressing engine, of a governor for controlling the speed thereof, and a pressure regulator or governor which, when the pressure of air exceeds the maximum pressure desired, is actuated by the compressed air to shut off the supply of steam to the engine, the speed-governor and the pressure regulator or governor being so organized that the former can operate independently of and without affecting the latter, substantially as specified.

2. The combination, with an air-compressing engine, of a governor for controlling the speed thereof, a pressure regulator or governor, and a weight applied to said regulator or governor which will hold it inoperative until the air exceeds the maximum pressure desired, but will then permit it to be actuated by the compressed air to shut off the supply of steam to the engine, the speed-governor and the pressure regulator or governor being so organized that the former can operate independently of and without affecting the latter, substantially as specified.

3. The combination, with an air-compressing engine and an air reservoir or receiver, of a governor for controlling the speed of the engine, a pressure regulator or governor to be operated by air escaping from said reservoir or receiver when the pressure therein exceeds the maximum pressure desired, and mechanism actuated by said pressure regulator or governor for controlling the admission of steam to the engine, the speed-governor and the pressure regulator or governor being so organized that the former can operate independently of and without affecting the latter, substantially as specified.

4. The combination, with an air-compressing engine furnished with cut-off-valve gear and an air reservoir or receiver, of a governor for controlling the speed of the engine and a pressure regulator or governor to be operated by air escaping from said reservoir or receiver when the pressure therein exceeds the maximum pressure desired, and mechanism actuated by the pressure regulator or governor and connected with the cut-off-valve gear, so as to shift the latter, the speed-governor and the pressure regulator or governor being so organized that the former can operate independently of and without affecting the latter, substantially as specified.

5. The combination, with an air-compressing engine having the valve-rods H and I and furnished with governors G, to the spindles $i$ of which the cut-off-valve rods I are connected, the reservoir D, valve E, and pipe F, of a pressure regulator or governor to be operated by air escaping through the pipe F, and the pivoted levers J, the ends of which project under the ends of the governor-spindles $i$, the governors G and the pressure regulator or governor being so organized that the former can operate independently of and without affecting the latter, substantially as specified.

6. The combination, with the regulator-motor, comprising the piston $c$, cylinder $d$, and reservoir $e$ for liquid, of the cut-off-valve rods I, the governor-spindles $i$, and the pivoted levers J, actuated by said piston, for acting upon the governor-spindles, substantially as specified.

7. The combination, in a regulator-motor, of the piston $c$, cylinder $d$, reservoir $e$ for liquid, aperture $f$, affording communication between said cylinder and jacket, and adjustable regulating-screw $g$, all arranged and acting substantially as and for the purpose specified.

GEO. H. REYNOLDS.

Witnesses:
   A. C. WEBB,
   CHANDLER HALL.